United States Patent
St. Jacques

(10) Patent No.: US 8,395,794 B2
(45) Date of Patent: Mar. 12, 2013

(54) SYSTEM FOR MAINTAINING A CACHE OF PRINTER-READABLE PRIORITIZED CONTENT

(75) Inventor: Robert St. Jacques, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1077 days.

(21) Appl. No.: 11/706,698

(22) Filed: Feb. 15, 2007

(65) Prior Publication Data

US 2008/0198399 A1  Aug. 21, 2008

(51) Int. Cl.
- G06F 7/492 (2006.01)
- G06F 15/16 (2006.01)
- G11C 11/06 (2006.01)
- G06K 15/00 (2006.01)

(52) U.S. Cl. ........ 358/1.15; 365/244; 358/1.16; 709/218

(58) Field of Classification Search ................ 358/1.15, 358/1.16; 365/244; 709/218
See application file for complete search history.

(56) References Cited

U.S. PATENT DOCUMENTS

| | | | |
|---|---|---|---|
| 5,001,696 A * | 3/1991 | Baldwin | 365/244 |
| 2003/0086098 A1 | 5/2003 | Sesek et al. | |
| 2004/0021905 A1* | 2/2004 | Holmstead et al. | 358/1.16 |
| 2006/0069746 A1* | 3/2006 | Davis et al. | 709/218 |
| 2007/0019221 A1 | 1/2007 | Jurkowski et al. | |

FOREIGN PATENT DOCUMENTS

| | | |
|---|---|---|
| GB | 2376331 A * | 12/2002 |
| JP | 09-188011 | 7/1997 |
| JP | 2000-010840 | 1/2000 |
| JP | 2000-330746 | 11/2000 |
| WO | 2004/038580 | 5/2004 |

OTHER PUBLICATIONS

European Search Report dated Feb. 18, 2011 for European Patent Appln. No. EP 08 15 1366.

* cited by examiner

*Primary Examiner* — Charlotte M Baker
*Assistant Examiner* — Justin Katzwhite
(74) *Attorney, Agent, or Firm* — MH2 Technology Law Group LLP

(57) ABSTRACT

A system for prioritizing a cache of print jobs associated with at least one print driver includes a workstation having a processing unit and at least one print driver having a processing unit, that interface via a network. The workstation implements a print job request for a document and determines whether a document key identifier associated with the document exists. If not, a key is created. If a printer-readable format for a document associated with the key identifier is stored in or is pre-existing in one of at least two caches, the print driver assigns a prioritization identifier to the format. The system retrieves the printer-readable format from the cache to produce a print job output. Since the cache stores the document in printer-readable format, overall printing time is reduced. The format may be moved from one cache to another depending upon priority. The corresponding method is also disclosed.

28 Claims, 4 Drawing Sheets

SYSTEM FOR MAINTAINING A CACHE OF PRINTER-READABLE PRIORITIZED CONTENT

BACKGROUND

1. Technical Field

The present disclosure relates to systems and methods for printing and converting documents from a workstation to a print driver.

2. Description of Related Art

In current printing environments, frequently printed and popular documents (e.g. memos, e-mails, manuals, corporate logos, business cards, photographs, letterhead, etc) must be completely reprocessed each time they are printed. The user selects the document(s) to be printed from a workstation, and then transmits the document(s) to a print driver over a network. The print driver translates or converts the data from a language in a computer-readable format such as PostScript or Adobe PDF into a printer-readable format such as a binary language that the print driver understands (a computationally intensive process often referred to as "rasterizing" or "ripping"), and then generates the print job output from the printer-readable format. (As defined herein, the terminology "print driver" refers to a printer or an image marking device). Even for some small jobs, such as a single photograph, the translation or conversion into the printer-readable format can result in delays of several minutes as the data are transmitted and ripped.

SUMMARY

In view of the problems regarding prior art systems and methods for processing print job requests, the present disclosure relates to a system for prioritizing a cache of print jobs associated with at least one print driver. The system includes a workstation having a processing unit and at least one print driver having a processing unit. The workstation and the at least one print driver are configured for interfacing via a network. The processing unit of the workstation has a set of programmable instructions configured for: implementing a print job request for a document; and determining whether a document key identifier associated with the document exists. If no document key identifier exists, the set of programmable instructions of the workstation creates a document key identifier associated with the document. The processing unit of the at least one print driver has a set of programmable instructions configured for determining whether a printer-readable format for a document associated with the document key identifier is stored in at least one of at least two caches configured for interfacing with the workstation and with the at least one print driver via the network. The processing unit of the at least one print driver may further include a set of programmable instructions configured for assigning a prioritization identifier to the printer-readable format if a printer-readable format for a document associated with the document key identifier is stored in the at least one of the at least two caches. The processing unit of the at least one print driver may further include a set of programmable instructions configured for: retrieving the printer-readable format corresponding to the document associated with the document key identifier from the at least one of the at least two caches; and producing a print job output from the printer-readable format.

When a printer-readable format corresponding to the document associated with the document key identifier is not stored in the at least one of the at least two caches, the processing unit of the at least one print driver may further include a set of programmable instructions configured for: processing the print job request as a print job request for a novel printer-readable format by creating a document key identifier associated with the document; and converting the document into a printer-readable format. The processing unit of the at least one print driver may further include a set of programmable instructions configured for: assigning a prioritization identifier to the printer-readable format; and storing in the at least one of the at least two caches, for the document, at least one of the document key identifier associated with the document; the prioritization identifier assigned to the printer-readable format; and the printer-readable format corresponding to the document and the document key identifier.

The at least two caches may comprise a first cache and a second cache, and wherein the printer-readable format is stored in the first cache, the processing unit of the at least one print driver may further include a set of programmable instructions configured for at least one of copying and moving the printer-readable format to the second cache if a priority threshold for the prioritization identifier has been met for the printer-readable format. Additionally, the processing unit of the at least one print driver further may include a set of programmable instructions configured for removing the printer-readable format from the first cache if a priority threshold for the prioritization identifier has not been met for the printer-readable format. The prioritization identifier may include at least one of a timestamp, a document length, and a document topic.

The processing unit of the at least one print driver may further include a set of programmable instructions configured for: retrieving the printer-readable format corresponding to the document associated with the document key identifier from the at least one cache; and producing a print job output from the printer-readable format. The at least two caches may include a first cache and a second cache. The first cache may be a persistent cache and the second cache may be a temporary cache. At least one of the at least two caches may reside in either the at least one print driver or in a data memory storage accessible via the network, or combinations thereof.

The present disclosure relates also to a workstation for prioritizing a cache of print jobs associated with at least one print driver as described above. Correspondingly, the present disclosure relates also to at least one print driver for prioritizing a cache of print jobs as described above.

In addition, the present disclosure relates to a method for prioritizing a cache of print jobs associated with at least one print driver. The method includes: implementing a print job request for a document; determining whether a document key identifier associated with the document exists, wherein if no document key identifier exists, creating a document key identifier; and determining whether a printer-readable format for a document associated with the document key identifier is stored in at least one of at least two caches. If a printer-readable format for a document associated with the document key identifier is stored in the at least one of the at least two caches, the method may further include assigning a prioritization identifier to the printer-readable format for the document associated with the document key identifier. In addition, the method may further include retrieving the printer-readable format corresponding to the document associated with the document key identifier from the at least one of the at least two caches; and producing a print job output from the printer-readable format.

If a printer-readable format corresponding to the document associated with the document key identifier is not stored in the at least one of the at least two caches, the method may further include: processing the print job request as a print job request for a novel printer-readable format by creating a document key identifier associated with the document; and converting the document into a printer-readable format. The method may further include: assigning a prioritization identifier to the printer-readable format; and storing in the at least one of the at least two caches, for the document, at least one of the document key identifier associated with the document, the prioritization identifier assigned to the printer-readable format, and the printer-readable format corresponding to the document and the document key identifier.

The method may also further include: storing in the at least one of the at least two caches, for the document, at least one of the document key identifier associated with the document, the prioritization identifier assigned to the printer-readable format, and the printer-readable format corresponding to the document and the document key identifier. In one embodiment, the at least two caches may include a first cache and a second cache, wherein if a priority threshold for the prioritization identifier has been met for the printer-readable format, and wherein the printer-readable format is stored in the first cache, the method may further include: at least one of copying and moving the printer-readable format to the second cache. In one embodiment, if a priority threshold for the prioritization identifier has not been met for the printer-readable format, and the printer-readable format is stored in the first cache, the method may further include removing the printer-readable format from the first cache. Furthermore, in one embodiment, if a priority threshold for the prioritization identifier has been met for the printer-readable format, and the printer-readable format is stored in the first cache, the method may further include at least one of copying and moving the printer-readable format to the second cache. Again, the prioritization identifier may include at least one of a timestamp, a document length, and a document topic. The method may further include: retrieving the printer-readable format corresponding to the document associated with the document key identifier from the at least one cache; and producing a print job output. The method may be implemented wherein the at least two caches comprises a first cache and a second cache, and wherein the first cache is a persistent cache and the second cache is a temporary cache. In addition, the method may be implemented wherein at least one of the at least two caches reside in one of the at least one print driver and in a data memory storage accessible via the network.

BRIEF DESCRIPTION OF THE DRAWINGS

Various embodiments of the present disclosure will be described herein below with reference to the figures wherein.

DETAILED DESCRIPTION

To address the issues related to prior art methods of requesting a print job as described above, the present disclosure relates to caching by a print driver in printer-readable format of documents, e.g., rasterized renditions of popular, lengthy or important documents in order to avoid the cost or time associated with re-rasterization with each re-printing.

Figure 1:
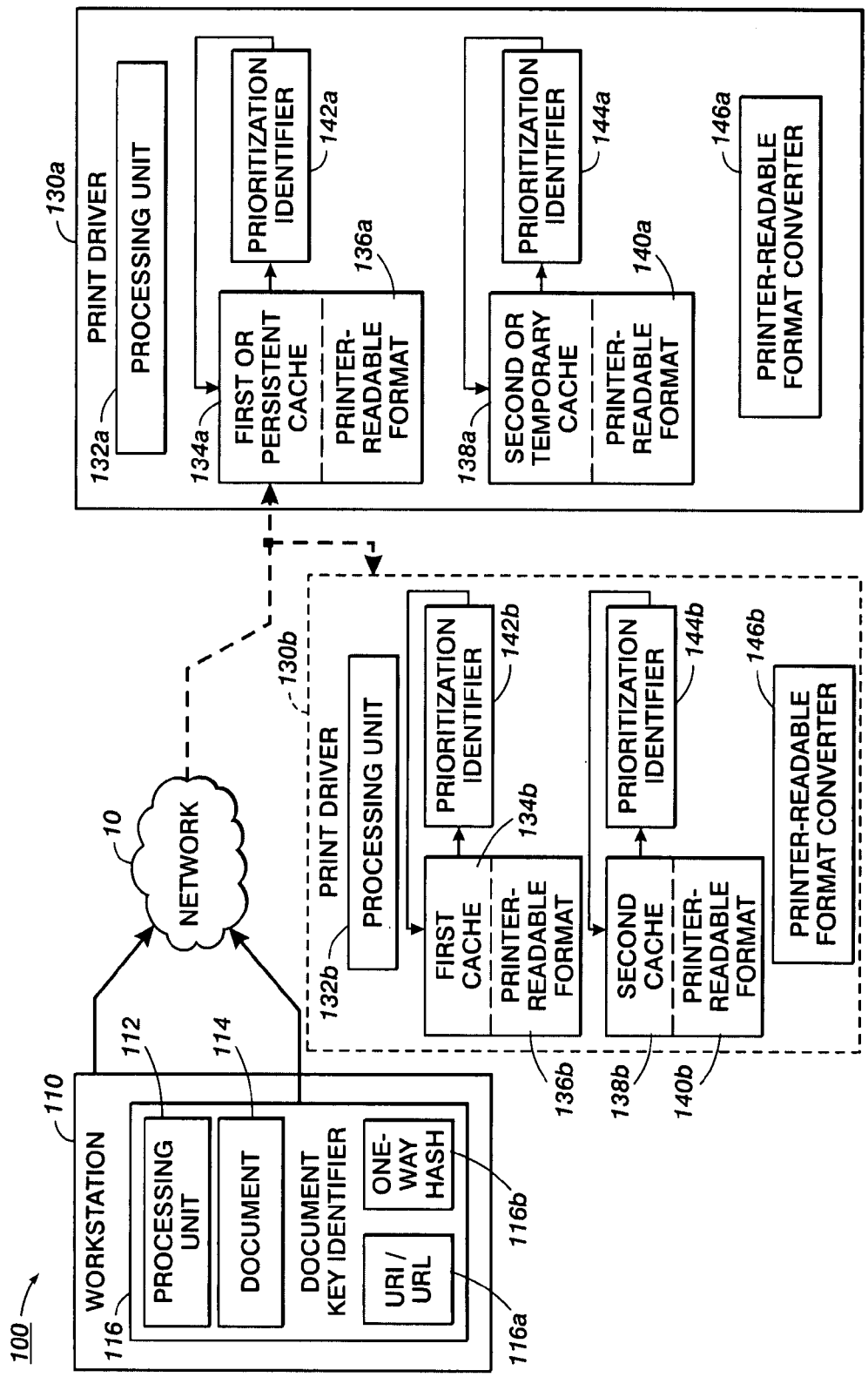
FIG. 1 illustrates a system for maintaining and prioritizing a cache of print jobs associated with at least one print driver, according to the present disclosure.

Referring to FIG. 1, there is illustrated a system 100 according to the present disclosure that includes a workstation 110 that has a processor or processing unit 112. The system 100 further includes at least one print driver 120a and may include additional print drivers such as print driver 120b, wherein the workstation 110 and the at least one print driver 120a and any additional print drivers such as print driver 120b are configured for interfacing via a network 10. The processing unit 112 of the workstation 110 has a set of programmable instructions, e.g., software, configured for implementing a print job request for a document 114 that is stored electronically by the processor or processing unit 112 in computer-readable format.

The programmable instructions of the processor 112 are configured also for determining whether a document key identifier 116 exists, wherein the document key identifier 116 is associated with the document 114. That is, documents such as document 114 may be identified by the (nearly) unique key identifier 116 generated by the print job request. If no document key identifier exists, the processor 112 of the workstation 110 creates a document key identifier, such as document key identifier 116. The document key identifier 116 is a suitable identifier, e.g., a universal resource identifier (URI) or universal resource locator (URL), or output from a one-way hash function, among others. Due to the fact that creation and transmission of the document key identifier 116 are additional functions that must be performed by the workstation 110 during the course of a print job request, in one embodiment, the document key identifiers 116 are maintained as small and created as fast as practical. The URIs may be submitted directly to the print device and used as keys to uniquely identify documents. The one-way-hash function translates relatively large arrays of binary data into a key value. Similarly, in one embodiment, the creation of the hash function is as fast and efficient as practical, and guarantees the uniqueness of the key in the majority of circumstances (i.e. two different documents should not generate the same key). Similar keys are used in encryption to ensure that data has not been modified during transmission.

The print drivers 130a and 130b each include processors or processing units 132a and 132b, respectively, that have a set of programmable instructions configured for determining whether a printer-readable format, e.g., printer-readable format 136a, 136b is stored in or is pre-existing in first or persistent cache 134a and 134b, or printer-readable format 140a and 140b is stored in or is pre-existing in second or temporary cache 138a and 138b, respectively. The caches 134a, 134b and 138a, 138b are configured for interfacing with the workstation 110 and with the print drivers 130a and 130b, respectively, via the network 10. The caches 134a, 134b and 138a, 138b may reside in print drivers 130a, 130b, respectively, as shown, or in a data memory storage (not shown) that is accessible via the network 10. The network 10 may be a local area network (LAN) or a wide area network (WAN) such as the internet. In addition, the network may be configured for wireless or contactless interaction, e.g., such as by electromagnetic, optical, or acoustic signals. Also, as defined in the background above, and as used herein, terms such as "ripping", "ripped", "rasterizing" or "rasterized" refer to conversion or translation of a document from a computer-readable format to a print driver-readable or printer-readable format. The printer-readable format may be in the form of binary data, among others. For simplicity, the terminology printer-readable format is used herein rather than print driver-readable format, with the terminology being equivalent.

If a printer-readable format for a document, e.g., document 114, associated with the document key identifier 116, is stored in at least one of the two caches 134a, 134b or 138a, 138b, the processor 132a, 132b includes a set of programmable instructions configured for assigning a prioritization identifier, e.g., prioritization identifier 142a, 142b to a printer-readable format 136a, 136b stored in the first or persistent cache 134a, 134b or prioritization identifier 144a, 144b to a printer-readable format 140a, 140b stored in the second or temporary cache 138a, 138b, respectively. The processor 132a, 132b may also include a set of programmable instructions configured for retrieving the printer-readable format 136a, 136b and 140a, 140b corresponding to the document, e.g., document 114, associated with the document key identifier 116 from at least one of the two caches 134a, 134b and 138a, 138b, and producing a print job output from the printer-readable format 136a, 136b or 140a, 140b, respectively.

Conversely, if a printer-readable format corresponding to the document 114 associated with the document key identifier 116 is not stored in the at least one of the at least two caches 134a, 134b or 138a, 138b, the processor or processor unit 132a, 132b of the at least one print driver 130a, 130b includes a set of programmable instructions configured for processing the print job request as a print-job request for a novel printer-readable format by creating a document key identifier 116 associated with the document 114 and converting the document 116, via printer-readable format converter 146a, 146b, into a printer-readable format, e.g., printer-readable format 136a, 136b and 140a, 140b corresponding to the document, e.g., document 114, respectively.

In addition, the processor 132a, 132b of the at least one print driver 130a, 130b may include a set of programmable instructions configured for assigning a prioritization identifier, e.g., prioritization or priority identifier 142a, 142b to the printer-readable format 136a, 136b stored in first cache 134a, 134b or prioritization identifier 144a, 144b to the printer-readable format 140a, 140b stored in second cache 138a, 138b, respectively. The set of programmable instructions for the processor 132a, 132b may also be configured for storing in at least one of the at least two caches 134a, 134b or 138a, 138b, for the document 114, at least one of the document key identifier 116 associated with the document 114; the prioritization identifier 142a, 142b or 144a, 144b assigned to the printer-readable format 136a, 136b or 140a, 140b; and the printer-readable format 136a, 136b or 140a, 140b corresponding to the document 114 and the document key identifier 116, respectively.

Figure 2:
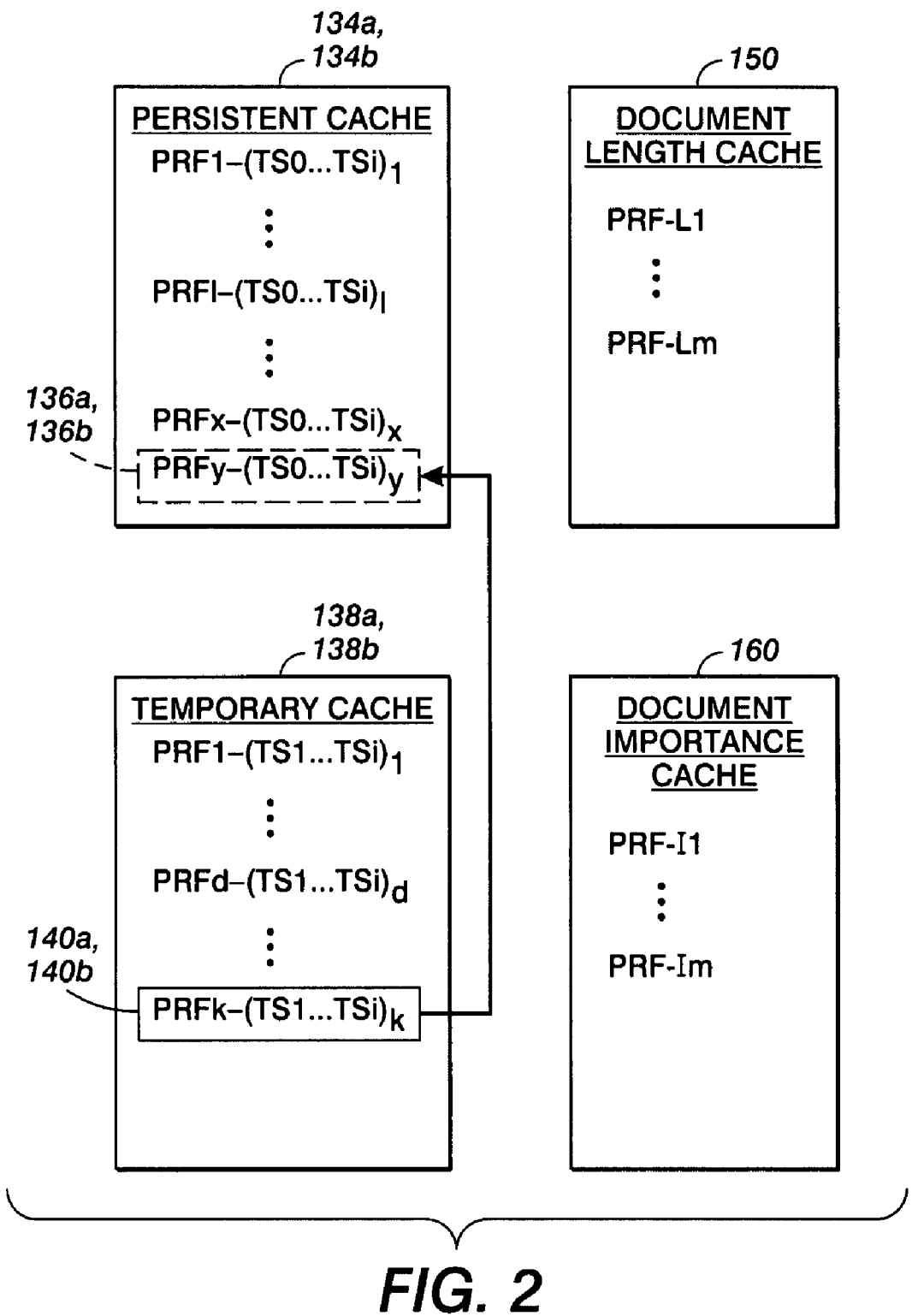
FIG. 2 illustrates an example of caches that are configured to move from one cache to another cache a printer-readable format for a document associated with a document key identifier according to the present disclosure.

Referring to FIG. 2, the prioritization identifier 142a, 142b or 144a, 144b may include a timestamp and/or a document length and/or a document topic. A particular prioritization threshold is associated with each of the prioritization or priority identifiers 142a, 142b or 144a, 144b, respectively. In the case where the prioritization identifier is frequency of printing of a particular printer-readable format corresponding to a document, the frequency is determined by applying a timestamp, e.g., TS0, to the printer-readable format to indicate the time and date at which the printer-readable format, e.g. PRF1, was printed. If the printer-readable format is printed a second or multiple times, e.g., "n" times, multiple timestamps up to TSi are assigned. Therefore, the print drivers 130a, 130b leverage local (or shared) storage to store the recently printed printer-readable formats PRF1 to PRFx in the second or temporary cache 138a, 138b, respectively. The processor 132a, 132b of the print driver 130a, 130b, respectively, tracks the frequency at which the printer-readable formats PRF1 to PRFx are printed (number of prints over time) to determine whether or not each document meets a popularity threshold based on the print frequency.

One example algorithm for determining print frequency might be:

Given:
    n=number of timestamps
    $timestamp_0$=TS0, oldest timestamp
    $timestamp_i$=TSi, most recent timestamp
    frequency "f"=n/(TSi−TS0), where n=i+1

Other algorithms may include the number of unique users, or restrict the timestamps to a certain interval (e.g. only prints in the last 7 days are counted).

A printer-readable format, e.g., printer-readable format PRF3 that corresponds to a document, that meets or exceeds the designated threshold print frequency is moved from the temporary cache 138a, 138b to the persistent cache 134a, 134b, respectively, where the printer-readable format PRF3 can be quickly and easily accessed as needed. The print driver 130a, 130b must be able to uniquely identify documents (e.g. through the use of URIs/URLs 116a or hash functions 116b) so that the printer-readable format PRF3 can be retrieved from the cache 134a, 134b as needed without re-transmitting or re-ripping the content thereof.

The higher the frequency, the more popular the document. Additional data may also be stored, such as the number of unique users that have printed the document (so that popularity=frequency*users for example).

The temporary cache 138a, 138b may be in the form of a hash map and which stores recently printed documents. The temporary cache 138a, 138b may or may not be stored persistently (meaning that the temporary cache 138a, 138b may persist across restarts of the print driver 130a, 130b), and resides in the print driver 130a, 130b, respectively. Since the temporary cache 138a, 138b stores recently printed documents, new documents entering the system for the first time can be tracked against older documents.

The persistent cache 134a, 134b, is also in the form of a hash map, and stores exactly the same types of key/value pairs. The major difference is that content is only promoted to the persistent cache once it meets or exceeds a certain popularity threshold. For example, if the frequency of one of the stored documents in the temporary cache exceeds the frequency of the least popular document in the persistent cache, the older document may be removed and replaced with the newer document. The permanent cache is also likely to be much larger, perhaps an order of magnitude larger than the temporary cache. Therefore, the persistent cache 138a, 138b accommodates the more popular documents.

Distributed or network accessible storage may be used to allow a pool of print drivers to share the same cache(s). Alternatively, a suitable distributed or network file system may be employed (not shown) to interface with the print drivers 130a, 130b via the network 10. Examples of currently available or known distributed or network file systems include "Ceph", "DCE Distributed File System", "Google File System", "Hadoop", "Lustre", and "Microsoft Distributed File System", among others.

As also illustrated in FIG. 2, the prioritization categories can be frequency of use (the timestamp), but can also include length of the document and the fact that considerable time would be required to print out the document should a user want to do so, even if infrequently. Printer-readable formats corresponding to such documents are stored in document length cache 150. For example, printer-readable formats PRF-L1 to PRF-Lm are stored in the document length cache 150. Printer-readable formats PRF-L1 to PRF-Lm may or may not be subjected to periodic review to determine the necessity of continued storage therein and the desirability of moving one or more selected printer-readable formats PRF-L1 to PRF-Lm to another cache such as the persistent cache 134a, 134b or simply removing one or more selected printer-readable formats PRF-L1 to PRF-Lm entirely from the system 100 if a priority threshold has not been met. However, the review process may be performed over much longer time intervals as compared to the temporary cache 138a, 138b.

The prioritization categories can also include importance of the topic or subject of the document. For example, even though a document may not be used frequently, that particular document and a series of related documents might need to be printed sequentially at the same time when called upon (e.g., for a report or for a meeting, etc.). Therefore, printer-readable formats corresponding to such documents are stored in document importance cache 160. In particular, printer-readable formats PRF-I1 to PRF-Im may be stored in document importance cache 160 and also may or may not be subjected to periodic review to determine the necessity of continued storage therein and the desirability of moving one or more selected printer-readable formats PRF-I1 to PRF-Im to another cache such as the persistent cache 134a, 134b or simply removing one or more selected printer-readable formats PRF-I1 to PRF-Im entirely from the system 100 if a priority threshold has not been met. Again, the review process may be performed over much longer time intervals as compared to the temporary cache 138a, 138b.

As is the case with respect to the persistent cache 134a, 134b, the document length cache 150 and the document importance cache 160 may reside either within the one or more print drivers 132a, 132b, respectively, or in a data memory storage (not shown) that is accessible via the network 10, e.g., a distributed or network file system as described above.

As can be appreciated from the above discussion, the present disclosure relates also to the workstation 110 for prioritizing a cache of print jobs associated with the at least one print driver 130a, 130b. The workstation 110 has the processing unit 112, wherein the workstation 110 is configured for interfacing with at least one print driver 130a, 130b via the network 10, and the processing unit 112 has a set of programmable instructions configured for implementing a print job request for document 114 and determining whether a document key identifier, e.g., document key identifier 116, associated with the document 114 exists. If no document key identifier exists, the processing unit 132a, 132b, respectively, creates a document key identifier, e.g., document key identifier 116.

Correspondingly, the present disclosure relates also to the at least one print driver 130a, 130b for prioritizing a cache of print jobs. The at least one print driver 130a, 130b is configured for interfacing with the workstation 110 that has the processing unit 112. The workstation 110 and the at least one print driver 130a, 130b are configured for interfacing via the network 10. The processing unit 132a, 132b of the at least one print driver 130a, 130b has a set of programmable instructions configured for determining whether a printer-readable format associated with the document key identifier 116 created by the workstation 110 is stored in one of the at least two caches 134a, 134b and 138a, 138b that is configured for interfacing with the workstation 110 and with the at least one print driver 130a, 130b via the network 10, respectively.

Figure 3A:
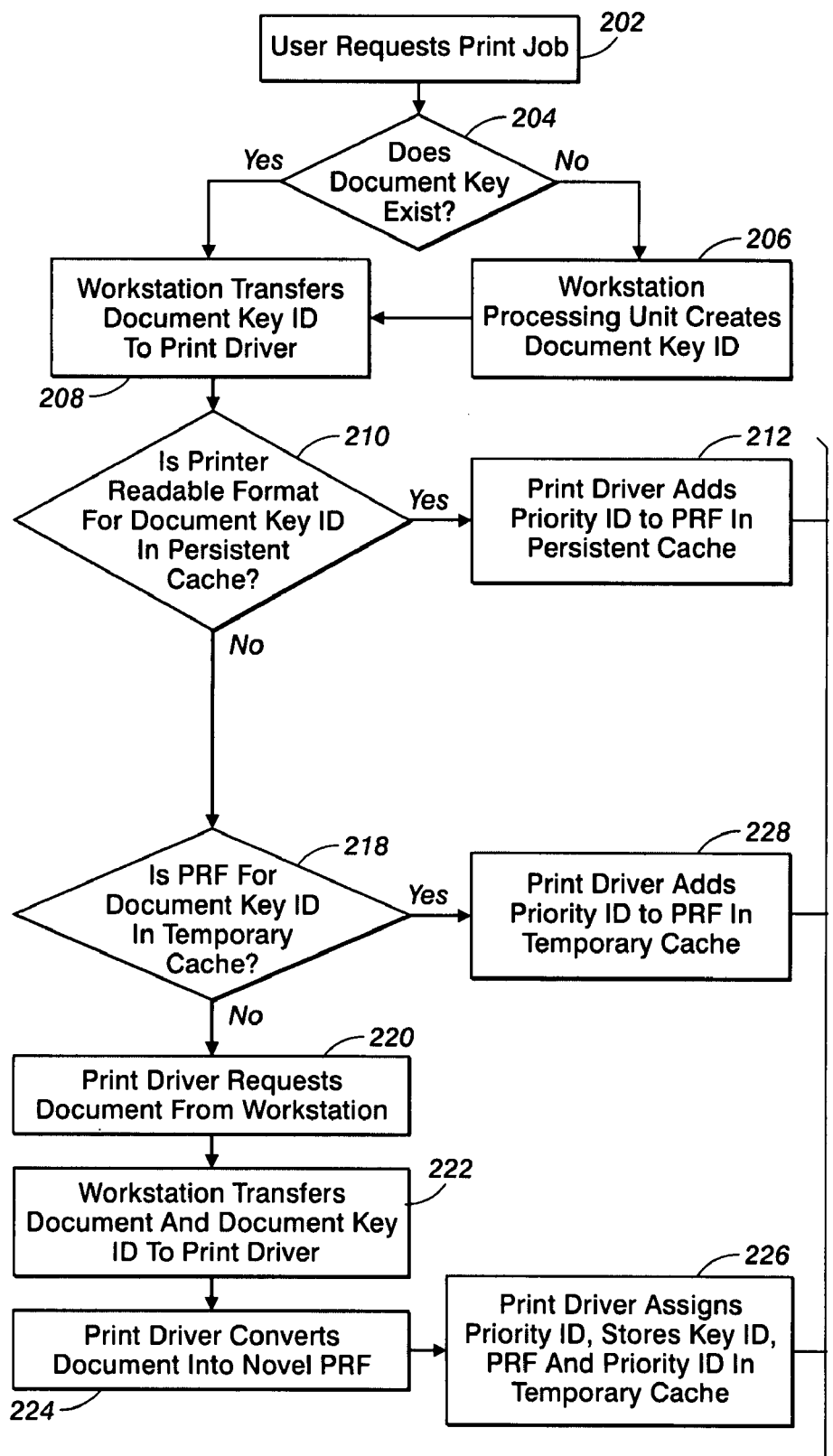
FIG. 3A is a logic flow diagram for a method of maintaining and prioritizing a cache of print jobs associated with at least one print driver according to the present disclosure.
Figure 3B:
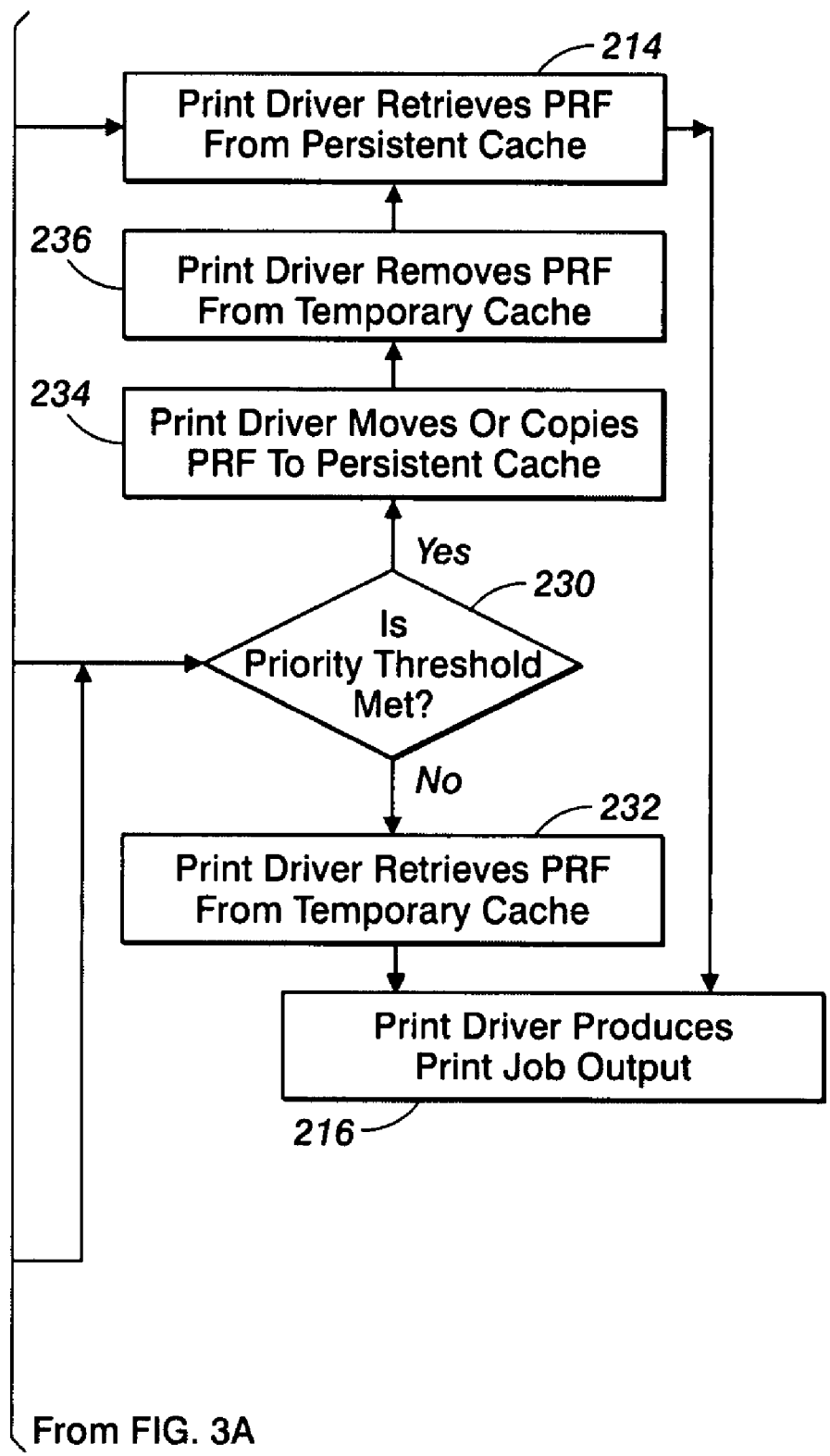
FIG. 3B is a continuation of the logic flow diagram of FIG. 3A.

Referring also to FIGS. 3A and 3B, the present disclosure relates also to a method 200 for prioritizing a cache of print jobs associated with at least one print driver. More particularly, the method 200 includes in step 202 implementing a print job request for a document, e.g., document 114. Step 204 includes determining whether a document key identifier associated with the document exists, e.g., document key identifier 116. If no document key identifier exists, step 206 includes creating a document key identifier, e.g., document key identifier 116 being created by the workstation 100. If a document key identifier 116 exists or has been created, step 208 includes transferring the document key identifier 116 from the workstation 110 to the at least one print driver 130a, 130b via the network 10. The method 200 also includes in step 210 determining whether a printer-readable format for a document associated with the document key identifier 116 is stored in at least one of at least two caches, e.g., whether printer-readable format 136a, 136b is stored in first or persistent cache 134a, 134b of at least two caches, e.g., in second or temporary cache 138a, 138b, document length cache 150, or document importance cache 160, respectively.

If a printer-readable format, e.g., printer-readable format 138a, 138b, for a document, e.g., document 114, associated with the document key identifier 116 is stored in the persistent cache 134a, 134b, step 212 includes assigning a prioritization or priority identifier, e.g., identifier 142a, 142b to the printer-readable format to a printer-readable format 136a, 136b stored in the first or persistent cache 134a, 134b, respectively. Step 214 includes the print driver 130a, 130b retrieving the printer-readable format 138a, 138b from the persistent cache 134a, 134b, respectively. Thereupon, step 216 includes producing a print job out from the printer-readable format 138a, 138b.

Returning to decision step 210, if a printer-readable format for a document associated with the document key identifier 116 is not stored in at least one of the at least two caches, e.g., if printer-readable format 136a, 136b is not stored in persistent cache 134a, 134b, the method 200 includes the step 218 of determining whether a printer-readable format for a document associated with the document key identifier 116 is stored in temporary cache 138a, 138b, respectively. If a printer-readable format for a document associated with the document key identifier 116 is not stored in temporary cache 138a, 138b, step 220 includes processing the print job request as a print job request for a novel printer-readable format implemented by the at least one print driver 130a, 130b requesting the workstation 110 to create a document key identifier associated with the document, e.g., by creating document key identifier 116 associated with the document 114, respectively. Step 222 includes the workstation 110 transferring the document 114 and the document key identifier 116 from the workstation 110 to the at least one print driver 130a, 130b via the network 10, respectively.

Step 224 includes converting the document 114 into printer-readable format 140a, 140b via printer-readable format converter 146a, 146b, respectively. Thereupon, step 226 includes assigning a prioritization identifier, e.g., prioritization identifier 144a, 144b and storing in the second or temporary cache 138a, 138b at least one of the document key identifier 116 associated with the document 114, the prioritization identifier 144a, 144b assigned to the printer-readable format 140a, 140b, and the printer-readable format 140a, 140b corresponding to the document 114 and document key identifier 116, respectively.

Returning to decision step 218, if a printer-readable format for a document associated with the document key identifier 116 is stored in temporary cache 138a, 138b, e.g., printer-readable format 140a, 140b for document 114 associated with the document key identifier 116, step 228 includes assigning a prioritization identifier, e.g., prioritization identifier 144a, 144b such as a timestamp TSi to the printer-readable format 140a, 140b, respectively.

Upon completion of either step 226 or 228, decision step 230 includes determining whether a priority threshold for the prioritization identifier 144a, 144b has been met, e.g., for a novel printer-readable format, whether a priority threshold such as document length or document importance, or for a pre-existing printer-readable format, whether a priority threshold, such as print frequency, has been met.

If the priority threshold has not been met for either case, the method 200 includes the step 232 of retrieving the printer-readable format 140a, 140b corresponding to the document 114 associated with the key identifier 116 from the temporary cache 134a, 134b, respectively, and completing the step 216 of producing a print job output.

Returning to decision step 230, if the priority threshold has been met for printer-readable format 140a, 140b stored in temporary cache 138a, 138b, the step 234 includes at least one of copying the printer-readable format 140a, 140b and moving printer-readable format 140a, 140b from temporary cache 138a, 138b to the first or persistent cache 134a, 134b, effectively promoting printer-readable format 140a, 140b from temporary cache 138a, 138b to the first or persistent cache 134a, 134b, respectively. Step 236 includes removing the printer-readable format 140a, 140b from the temporary cache 138a, 138b. Upon completion of step 236, step 214 of retrieving the printer-readable format 140a, 140b from the persistent cache 134a, 134b, respectively, and step 216 of producing a print job output may be implemented.

In view of the above description, it can be appreciated that documents that have exemplary characteristics such as being either popular (thus having a high print frequency), lengthy or pertaining to an important topic, or combinations thereof, are stored in printer-readable format or ripped form (e.g., in a binary language that the print driver understands and can use to quickly produce output). Storage of the printer-readable format avoids the need to transmit the computer-readable document data, which must be converted to printer-readable format, from the workstation to the print driver over the network (only the document keys, which are much smaller than the actual data, need to be transmitted as part of the job), and avoids duplicating the CPU-intensive ripping process. The print driver simply uses the document-keys to retrieve the printer-readable format, which has already been ripped, and immediately begins producing output. While there will always be novel documents introduced to the print drivers, by avoiding transmission and ripping delays between frequently printed, lengthy or important print jobs, the throughput of the print driver may be increased, perhaps dramatically.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system for prioritizing a cache of print jobs associated with at least one print driver, the system comprising:
   a workstation having a processing unit;
   at least one print driver having a processing unit, the workstation and the at least one print driver configured for interfacing via a network, and
   wherein the processing unit of the workstation has a set of programmable instructions configured for:
   implementing a print job request for a document; and
   determining whether a document key identifier associated with the document exists, wherein if no document key identifier exists, creating the document key identifier associated with the document;
   transmitting the document key identifier to the at least one print driver; and
   wherein the processing unit of the at least one print driver has a set of programmable instructions configured for:
   receiving the document key identifier from the workstation;
   determining whether a printer-readable format for the document associated with the document key identifier is stored in at least one of at least two caches configured for interfacing with the workstation and with the at least one print driver via the network;
   assigning a prioritization identifier to the printer-readable format if the printer-readable format for the document associated with the document key identifier is stored in the at least one of the at least two caches;
   wherein the prioritization identifier is selected from the group consisting of a timestamp, a document length or a document topic;
   wherein if the prioritization identifier is the timestamp an additional timestamp is assigned for each print job request;
   wherein if the prioritization identifier is the document length, one cache of the at least two caches is a document length cache and the printer-readable format for the document associated with the document key identifier is stored in the document length cache; and
   wherein if the prioritization identifier is the document topic, one cache of the at least two caches is a document importance cache and the printer-readable format for the document associated with the document key identifier is stored in the document importance cache.

2. The system according to claim 1, wherein the processing unit of the at least one print driver further comprises a set of programmable instructions configured for:
   retrieving the printer-readable format corresponding to the document associated with the document key identifier from the at least one of the at least two caches; and
   producing a print job output from the printer-readable format.

3. The system according to claim 1, wherein the processing unit of the at least one print driver further comprises a set of programmable instructions configured for:
   processing the print job request as a print job request for a novel printer-readable format by creating the document key identifier associated with the document; and
   converting the document into the printer-readable format when the printer-readable format corresponding to the document associated with the document key identifier is not stored in the at least one of the at least two caches.

4. The system according to claim 3, wherein the processing unit of the at least one print driver further comprises a set of programmable instructions configured for:
   assigning a prioritization identifier to the printer-readable format; and
   storing in the at least one of the at least two caches, for the document, at least one of the document key identifier associated with the document; the prioritization identifier assigned to the printer-readable format; and the printer-readable format corresponding to the document and the document key identifier.

5. The system according to claim 1, wherein the processing unit of the at least one print driver further comprises a set of programmable instructions configured for:
storing in the at least one of the at least two caches, for the document, at least one of the document key identifier associated with the document; the prioritization identifier assigned to the printer-readable format; and the printer-readable format corresponding to the document and the document key identifier.

6. The system according to claim 4, wherein the at least two caches comprises a first cache and a second cache, and wherein the printer-readable format is stored in the first cache, the processing unit of the at least one print driver further comprises a set of programmable instructions configured for:
at least one of copying and moving the printer-readable format to the second cache if a priority threshold for the prioritization identifier has been met for the printer-readable format.

7. The system according to claim 4, wherein the at least two caches comprises a first cache and a second cache, and wherein the printer-readable format is stored in the first cache, the processing unit of the at least one print driver further comprises a set of programmable instructions configured for:
removing the printer-readable format from the first cache if a priority threshold for the prioritization identifier has not been met for the printer-readable format.

8. The system according to claim 5, wherein the at least two caches comprises a first cache and a second cache, and wherein the printer-readable format is stored in the first cache, the processing unit of the at least one print driver further comprises a set of programmable instructions configured for:
at least one of copying and moving the printer-readable format to the second cache if a priority threshold for the prioritization identifier has been met for the printer-readable format; and
wherein the printer-readable format is stored in one of the at least two caches, the processing unit of the at least one print driver further comprises a set of programmable instructions configured for:
removing the printer-readable format from the one of the at least two caches if a priority threshold for the prioritization identifier has not been met for the printer-readable format.

9. The system according to claim 4, wherein the processing unit of the at least one print driver further comprises a set of programmable instructions configured for:
retrieving the printer-readable format corresponding to the document associated with the document key identifier from the at least one cache; and
producing a print job output from the printer-readable format.

10. A workstation for prioritizing a cache of print jobs associated with at least one print driver, the workstation having a processing unit,
wherein the workstation is configured for interfacing with at least one print driver via a network,
wherein the processing unit of the workstation has a set of programmable instructions configured for:
implementing a print job request for a document; and
determining whether a document key identifier associated with the document exists, wherein if no document key identifier exists, creating a document key identifier;
wherein the at least one print driver has a set of programmable instructions configured for:
assigning a prioritization identifier to the printer-readable format if the printer-readable format for the document associated with the document key identifier is stored in the at least one of the at least two caches;
wherein the prioritization identifier is selected from the group consisting of a timestamp, a document length or a document topic;
wherein if the prioritization identifier is the timestamp an additional timestamp is assigned for each print job request;
wherein if the prioritization identifier is the document length, one cache of the at least two caches is a document length cache and the printer-readable format for the document associated with the document key identifier is stored in the document length cache; and
wherein if the prioritization identifier is the document topic, one cache of the at least two caches is a document importance cache and the printer-readable format for the document associated with the document key identifier is stored in the document importance cache.

11. At least one print driver for prioritizing a cache of print jobs, the at least one print driver configured for interfacing with a workstation having a processing unit;
the workstation and the at least one print driver configured for interfacing via a network,
wherein the processing unit of the workstation has a set of programmable instructions configured for:
implementing a print job request for a document; and
determining whether a document key identifier associated with the document exists, wherein if no document key identifier exists, creating a document key identifier; and
wherein the at least one print driver has a set of programmable instructions configured for:
determining whether a printer-readable format associated with the document key identifier is stored in one of at least two caches configured for interfacing with the workstation and with the at least one print driver;
assigning a prioritization identifier to the printer-readable format if the printer-readable format for the document associated with the document key identifier is stored in the at least one of the at least two caches;
wherein the prioritization identifier is selected from the group consisting of a timestamp, a document length or a document topic;
wherein if the prioritization identifier is the timestamp an additional timestamp is assigned for each print job request;
wherein if the prioritization identifier is the document length, one cache of the at least two caches is a document length cache and the printer-readable format for the document associated with the document key identifier is stored in the document length cache; and
wherein if the prioritization identifier is the document topic, one cache of the at least two caches is a document importance cache and the printer-readable format for the document associated with the document key identifier is stored in the document importance cache.

12. The at least one print driver according to claim 11 wherein the processing unit of the at least one print driver further comprises a set of programmable instructions configured for:

retrieving the printer-readable format corresponding to the document associated with the document key identifier from the at least one of the at least two caches; and producing a print job output from the printer-readable output.

13. The at least one print driver according to claim 11, wherein the processing unit of the at least one print driver further comprises a set of programmable instructions configured for:

processing the print job request as a print job request for a novel printer-readable format by creating a document key identifier associated with the document; and converting the document into a printer-readable format, when a printer-readable format corresponding to the document associated with the document key identifier is not stored in the at least one of the at least two caches.

14. The at least one print driver according to claim 13, wherein the processing unit of the at least one print driver further comprises a set of programmable instructions configured for:

assigning a prioritization identifier to the printer-readable format; and storing in the at least one of the at least two caches, for the document, at least one of the document key identifier associated with the document, the prioritization identifier associated with the document, and the printer-readable format corresponding to the document and the document key identifier.

15. The at least one print driver according to claim 11, wherein the processing unit of the at least one print driver further comprises a set of programmable instructions configured for:

storing in the at least one of the at least two caches, for the document, at least one of the document key identifier associated with the document, the prioritization identifier assigned to the printer-readable format, and the printer-readable format corresponding to the document and the document key identifier.

16. The at least one print driver according to claim 14, wherein the at least two caches comprises a first cache and a second cache, and wherein the printer-readable format is stored in the first cache, the processing unit of the at least one print driver further comprises a set of programmable instructions configured for:

at least one of copying and moving the printer-readable format to the second cache if a priority threshold for the prioritization identifier has been met for the printer-readable format.

17. The at least one print driver according to claim 14, wherein the at least two caches comprises a first cache and a second cache, and wherein the printer-readable format is stored in the first cache, the processing unit of the at least one print driver further comprises a set of programmable instructions configured for:

removing the printer-readable format from the first cache if a priority threshold for the prioritization identifier has not been met for the printer-readable format.

18. The at least one print driver according to claim 15, wherein the at least two caches comprises a first cache and a second cache, and wherein the printer-readable format is stored in the first cache, the processing unit of the at least one print driver further comprises a set of programmable instructions configured for:

at least one of copying and moving the printer-readable format to the second cache if a priority threshold for the prioritization identifier has been met for the printer-readable format; and wherein the printer-readable format is stored in one of the at least two caches, the processing unit of the at least one print driver further comprises a set of programmable instructions configured for:

removing the printer-readable format from the one of the at least two caches if a priority threshold for the prioritization identifier has not been met for the printer-readable format.

19. The at least one print driver according to claim 14, wherein the processing unit of the at least one print driver further comprises a set of programmable instructions configured for:

retrieving the printer-readable format corresponding to the document associated with the document key identifier from the at least one cache; and producing a print job output from the printer-readable format.

20. A method for prioritizing a cache of print jobs associated with at least one print driver, the method comprising:

implementing a print job request for a document;

determining whether a document key identifier associated with the document exists, wherein if no document key identifier exists, creating a document key identifier;

determining whether a printer-readable format for the document associated with the document key identifier is stored in at least one of at least two caches;

assigning a prioritization identifier to the printer-readable format if the printer-readable format for the document associated with the document key identifier is stored in the at least one of the at least two caches;

wherein the prioritization identifier is selected from the group consisting of a timestamp, a document length or a document topic;

wherein if the prioritization identifier is the timestamp an additional timestamp is assigned for each print job request;

wherein if the prioritization identifier is the document length, one cache of the at least two caches is a document length cache and the printer-readable format for the document associated with the document key identifier is stored in the document length cache; and wherein if the prioritization identifier is the document topic, one cache of the at least two caches is a document importance cache and the printer-readable format for the document associated with the document key identifier is stored in the document importance cache.

21. The method according to claim 20, further comprising:

retrieving the printer-readable format corresponding to the document associated with the document key identifier from the at least one of the at least two caches; and producing a print job output from the printer-readable format.

22. The method according to claim 20, wherein if a printer-readable format corresponding to the document associated with the document key identifier is not stored in the at least one of the at least two caches, the method further comprises:

processing the print job request as a print job request for a novel printer-readable format by creating the document key identifier associated with the document; and converting the document into a printer-readable format.

23. The method according to claim 22, further comprising:

assigning a prioritization identifier to the printer-readable format; and storing in the at least one of the at least two caches, for the document, at least one of the document key identifier associated with the document, the prioritization identifier assigned to the printer-readable format, and the printer-readable format corresponding to the document and the document key identifier.

24. The method according to claim 20, further comprising:
storing in the at least one of the at least two caches, for the document, at least one of the document key identifier associated with the document, the prioritization identifier assigned to the printer-readable format, and the printer-readable format corresponding to the document and the document key identifier.

25. The method according to claim 23, wherein the at least two caches comprises a first cache and a second cache, wherein if a priority threshold for the prioritization identifier has been met for the printer-readable format, and wherein the printer-readable format is stored in the first cache, the method further comprises:
at least one of copying and moving the printer-readable format to the second cache.

26. The method according to claim 23, wherein the at least two caches comprises a first cache and a second cache, wherein if a priority threshold for the prioritization identifier has not been met for the printer-readable format, and wherein the printer-readable format is stored in the first cache, the method further comprises:
removing the printer-readable format from the first cache.

27. The method according to claim 24, wherein the at least two caches comprises a first cache and a second cache, and wherein if a priority threshold for the prioritization identifier has been met for the printer-readable format, and wherein the printer-readable format is stored in the first cache, the method further comprises:
at least one of copying and moving the printer-readable format to the second cache; and
wherein if a priority threshold for the prioritization identifier has not been met for the printer-readable format, and wherein the printer-readable format is stored in one of the at least two caches, the method further comprises:
removing the printer-readable format from the one of the at least two caches.

28. The method according to claim 23, further comprising:
retrieving the printer-readable format corresponding to the document associated with the document key identifier from the at least one cache; and
producing a print job output from the printer-readable format.

\* \* \* \* \*